United States Patent [19]
Wieczorek et al.

[11] Patent Number: 5,557,076
[45] Date of Patent: Sep. 17, 1996

[54] CORDLESS POSITION DETECTION APPARATUS

[75] Inventors: Rudi Wieczorek, München; Dietrich Hahn, Neufahrn; Josef Rohrmülle, Fahrenzhausen, all of Germany

[73] Assignee: Mikron Gesellschaft Fur, Eching, Germany

[21] Appl. No.: 339,699

[22] Filed: Nov. 14, 1994

[30] Foreign Application Priority Data

Nov. 12, 1993 [DE] Germany ............ 43 38 766.7
Jan. 14, 1994 [DE] Germany ............ 44 00 946.1

[51] Int. Cl.⁶ ............................................. G08C 21/00
[52] U.S. Cl. ............................................. 178/19
[58] Field of Search ........................... 178/18, 19

[56] References Cited

U.S. PATENT DOCUMENTS

| 4,848,496 | 7/1989 | Murakami et al. ............ 178/19 |
| 5,045,645 | 9/1991 | Hoendervoogt et al. . |
| 5,220,324 | 6/1993 | Morita . |
| 5,235,142 | 8/1993 | Lendmeier et al. ............ 178/19 |
| 5,373,118 | 12/1994 | Watson ............ 178/19 |

FOREIGN PATENT DOCUMENTS

| 259894 | 3/1988 | European Pat. Off. . |
| 357397 | 3/1990 | European Pat. Off. . |
| 365918 | 5/1990 | European Pat. Off. . |
| 417921 | 3/1991 | European Pat. Off. . |
| 477098 | 3/1992 | European Pat. Off. . |
| 4100693 | 7/1991 | Germany . |
| WO9221082 | 11/1992 | WIPO . |

OTHER PUBLICATIONS

Patent Abstract of Japan, vol. 17, No. 474 (P–1602) Aug. 1993 re JP-A-5-113844.

Primary Examiner—Stephen Chin
Assistant Examiner—Paul Loomis
Attorney, Agent, or Firm—Cushman, Darby & Cushman

[57] ABSTRACT

A cordless position detection apparatus includes a position detection area and a pointer. A plurality of conductors are arranged side-by-side in the position detection area. The position detection area has a selection circuit for selecting single conductors, and a transmitting circuit that provides a transmitting signal having at least one harmonic to a selected conductor. A pointer for use with the position detecting area includes a resonance circuit which is tuned to an harmonic of the transmitting signal. The pointer is excited by the transmitting signal to oscillate and radiates a receiving signal. A receiving circuit in the detection apparatus detects the receiving signal in a selected conductor and processing means uses this received signal to determine a position indicated by the pointer.

56 Claims, 13 Drawing Sheets

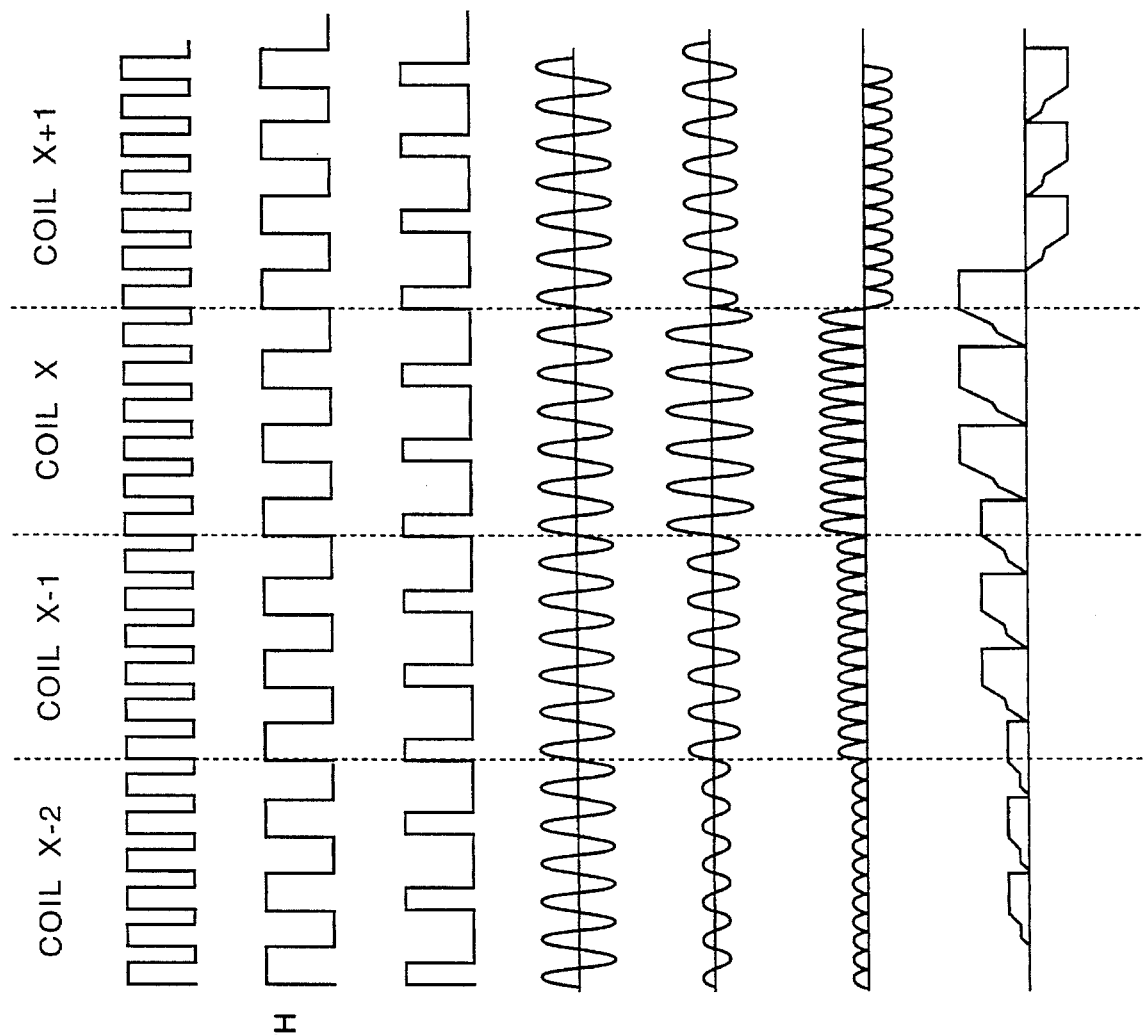

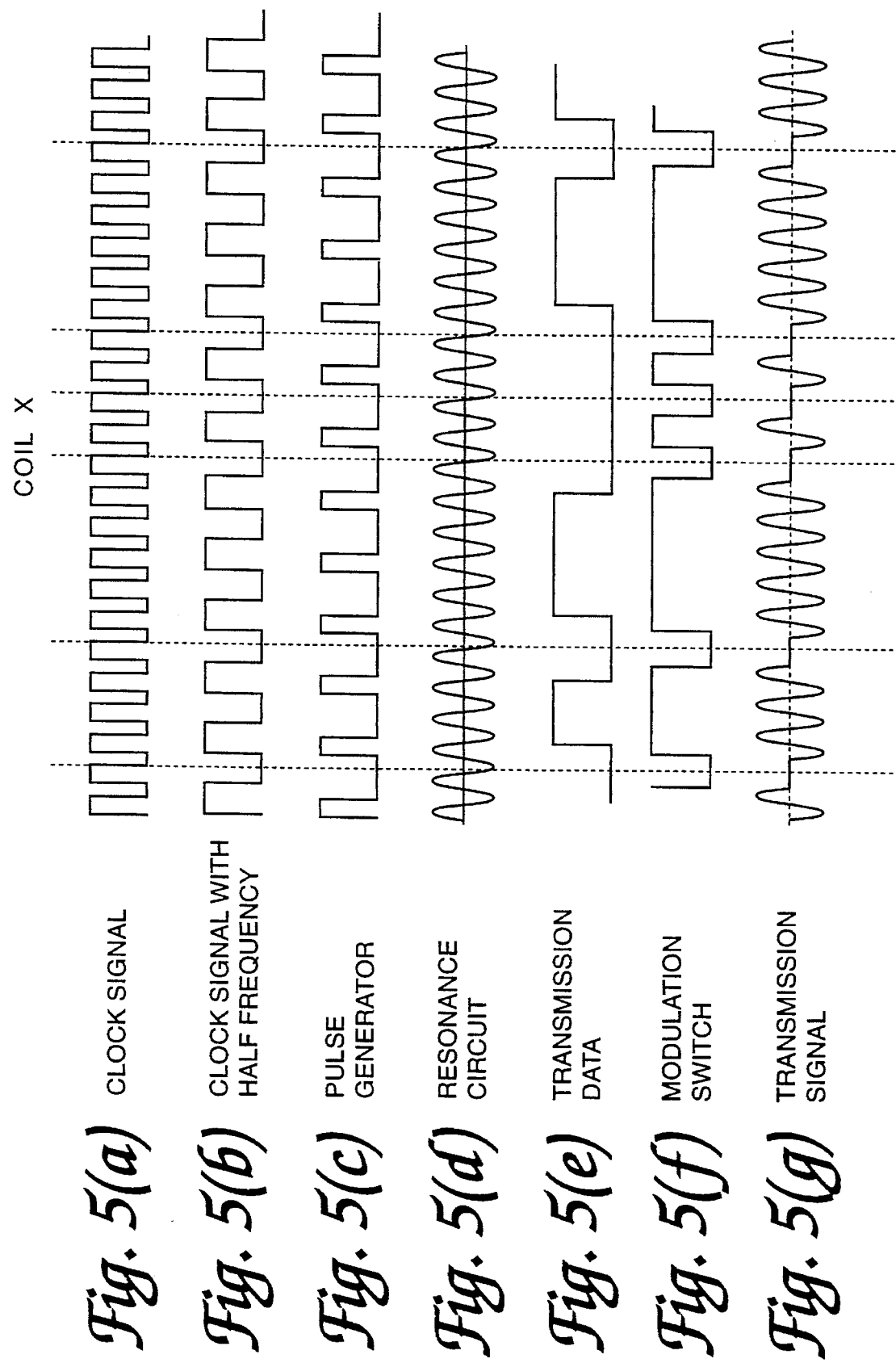

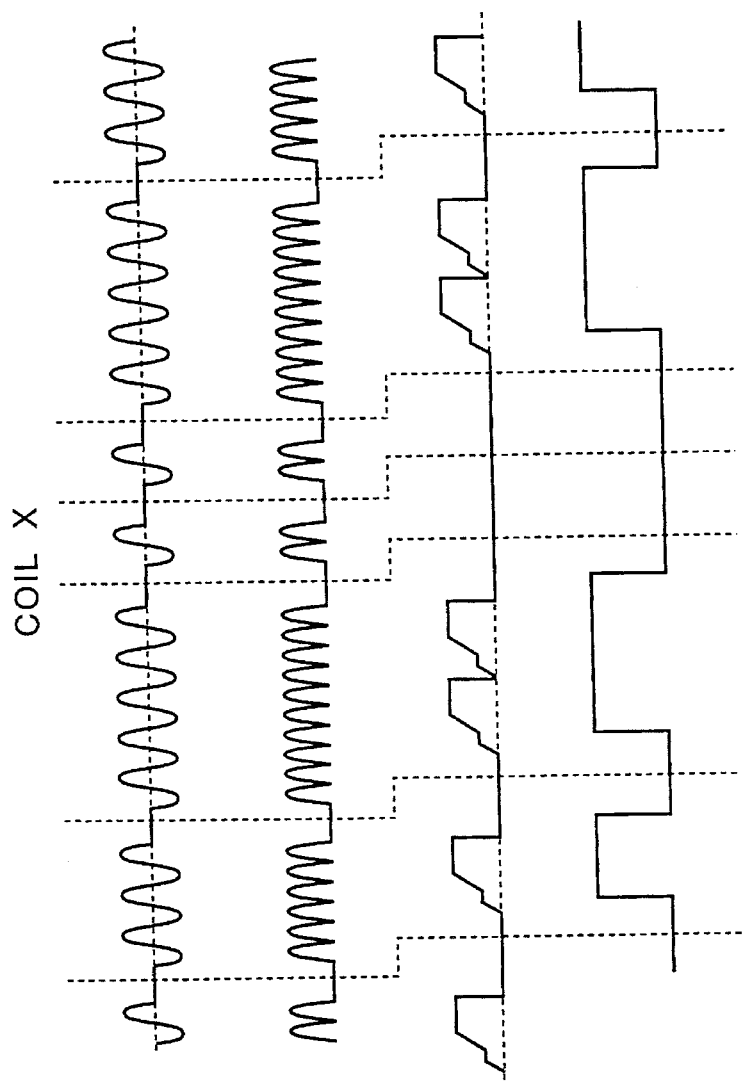

CORDLESS POSITION DETECTION APPARATUS

BACKGROUND OF THE INVENTION

The invention relates generally to a cordless position detection apparatus or digitizer, and in particular to a digitizer that does not require a battery.

Nowadays position detection apparatuses also known as graphic digitizers are well known in the art to input the coordinates of a point into a computer. In contrast to a common computer mouse in such a position detection apparatus the absolute position of a pointer or pointing instrument (pen or cursor) with respect to a working surface or tablet (position detection area) is converted into electrical signals.

From U.S. Pat. No. 5,045,645 and European patent 0 259 894 a wire- or cordless pen or cursor, not requiring a battery is known. By not using a battery in the pen costs, space and additional weight can be saved on. Furthermore, a discharged battery has not to be recharged or replaced. A cordless pen allows a free and comfortable operation of the pen over and across the table. Applications of such a position detection apparatus are for example in the construction, navigation or computer arts. Recently, applications of the so-called "pen computing" dealing with input into a computer by means of a pen are interesting applications requiring a position detection apparatus. The physical principle underlying a position detection apparatus using a cordless pen is a well-known principle from electro dynamics, namely that electromagnetic signals can be transmitted from one wire or coil to another wire or coil by means of induction.

The amplitude and phase of the transmitted signals depends on the relative position of transmitter and receiver and can hence be used for a localization of the transmitter and a receiver, respectively.

From WO 92/21 082 A1 a pointer (mouse or pen) is known that comprises a circuit including a memory in which data are stored for protection of access to an electronic device, for instance characteristics of the signature of a user entitled to use the electronic device.

From Japanese open-laid publication JP 05-113844 A a cordless and batteryless pen is known, the supply energy of which is transmitted and induced, respectively, from the outside.

European patent 0 357 397 teaches a pen with a plurality of coils that can be distinguished by the wires leading to the coils. Using these coils, a rotation of the pen can be recognized. Also non-circular shaped coils are used but only to save on space. It is not disclosed in this document to use the non-circular shaped coils for detection of a rotation of the pen.

From European patent 0 407 921 A2 a pen comprising a plurality of coils is known by which a rotation of the pen can be recognized. Coils use different frequencies in order to allow a distinction between said coils.

The known cordless and batteryless position detection apparatuses have the following disadvantages:

The position detection apparatus described in European patent application 0 259 894 uses for transmitting position information between the pen and the tablet a transient signal of a decreasing oscillation. The transmitting wire in the position detection area (tablet) has to be switched to a receiving mode after the transmitting signal has been switched off. Hence a quite large amount of time is needed to sample each wire as each transmitting and later receiving wire, respectively, has to excite an oscillation and receives afterwards a signal inductively by the decreasing oscillation of the oscillation circuit in the pen. This reduces significantly the rate to determine positions and to transmit data on positions. Furthermore, the signal of the oscillation circuit decreases exponentially causing inaccuracies in the detection of the coordinates. Furthermore, it is not possible to transmit a plurality of different data being sampled by the pen, i.e. data that do not relate to a position with respect to a tablet, that are to be transmitted to the tablet.

An alternative system is disclosed in U.S. Pat. No. 5,045, 645. However, an additional oscillation or resonance circuit is used for the cordless and batteryless transmission of information. In this system also no transmission of a plurality of detected information in the pen is provided, such as thickness of a line, colors or commands for manipulation of drawn objects. The technique for transmission of energy by modulation of a carrier does furthermore generate two side bands, i.e. one below and one above the carrier frequency. This has negative effects on the rate of transmission of coordinates.

OBJECTS OF THE INVENTION

It is an object of the present invention to create a cordless position detection apparatus in which the position and orientation with respect to a rotation of a pen can be sampled and transmitted easily and as close as possible to a real motion.

It is another object of the present invention to provide a special technique for transmitting energy into the pen. Hence, without a battery the pen can be an active instrument (=same effect as if there is a battery in the pen) that creates a plurality of new applications.

It a further object of the present invention to detect positions or coordinates more accurate.

It is a further object of the present invention to sample coordinates and positions respectively under the same and optimum conditions. This means for transmission of energy into the pen only the wire next to the pen is used.

It is a further object of the present invention that the transmission of energy into the cordless and batteryless pen is optimized, so that an active circuit in the pen can be supplied with energy.

It is a further object of the present invention to provide a plurality of sensors in the pen and to transmit data that have been sampled in the pen actively for further processing.

It is a further object of the present invention that the measurement of positions is separated from measurements of other sensors in the pen and does not influence the accuracies of these measurements.

It is a further object of the present invention that a user can have a pen that is assigned only to him because the pen is cordless. The user can carry the pen around with himself. The personalization of the pen becomes possible by the active circuit enabling data processing and transmission fom the pen, so that for example, only certain pointers (pens) can be used on certain tablets. This can be advantageous for example with respect to protection of data. The classical identification of a user or a person in general, i.e. their signature, can also be read by the position detection apparatus and by a comparison with prestored information on the signature or writing be checked, and can be used as an additional protection by identification.

It is a further object of the present invention that a signature of a user who signs with the pen can be transmitted from the pen for an external further processing. Thereby a "distance signing" of documents is made possible. It has to be understood that many known techniques from cryptography (public key . . . ) can be used to increase the security and/or the time and effort for data transmission and processing.

It is another object of the present invention in connection with controlling a robot or manipulations of objects on a monitor or screen (as for example with respect to a "human interface" in a computer or CAD-applications) and so on, that with one or a plurality of cordless and batterless position detections apparatuses the number of the degrees of freedom or input parameters for manipulation is increased. This is due to a special technique for transmitting energy into the pen.

It is another object of the present invention that in order to manipulate the objects of a screen by means of a pen or cursor the possibility of supplying input information is very similar and analogue, respectively, to the actual manipulation to be carried out.

SUMMARY OF THE INVENTION

A position detection apparatus according to the present invention comprises a position detection area or tablet in which a plurality of wires or coils are provided and being arranged side by side in the direction of the position measurement, a multiplexing or selecting circuit for selecting single wires, a transmitting circuit for providing a transmitting signal to a selected wire, a pointer or pen comprising an oscillation or resonance circuit that is excited to oscillate by the transmitting signal and emitting a receiving signal, a receiving circuit for detection of the receiving signal in a selected wire and a processing means for determining the position indicated by the pen by processing the receiving signals detected by the receiving circuit. The energy is continuously transmitted to the circuit. There is only one circuit being excited by the transmitting signal and for transmitting the receiving signal and the transmission of energy into the oscillating circuit is achieved by a harmonic, preferably the first harmonic, of the transmitting signal. By transmitting the energy using a harmonic of the transmitting signal a transmitting signal is required that can be generated in a simple way comprising a large amount of harmonics. It is an advantageous embodiment of the invention to use square pulses. However, also other signals with a large amount of harmonics in particular the first harmonic, are preferred.

In another embodiment of the invention the transmitting signal comprises a dead time, i.e. a time in which the transmitting signal is zero. In case the transmitting signal is periodical it is contemplated that the measurement of the position happens during this time whereby transmitting and receiving is separated in the time domain and thereby not coupled.

Preferably for the sake of a high transmission rate the position information of the repetition frequency of the pulses is in the order of magnitude of the frequency of the oscillation circuit. It is advantageous to carry out the detection of the receiving signal in said zero phase of the transmitting signal. Thereby the detection of the receiving signal is not influenced by disturbing and corrupting first order effects of the transmitting signal.

It is advantageous to tune the oscillation circuit to the first harmonic of the transmitting signal to ensure a large amount of transmission of energy into the pen. This transmission of a large amount of energy is particularly useful for electronic circuitry in the pen described further below with respect to further preferred embodiments.

With respect to a two-dimensional position or coordinate detection the position detection area or tablet contains two sets of wires, normally orthogonal to each other, i.e. in an X- and a Y-direction. The single wires of the X- and Y-set, respectively, are arranged side by side in direction of the position measurement, i.e. in X- and Y-direction, respectively.

To minimize effects arising from a coupling of transmitting and receiving it is advantageous to select wires from different wire assemblies for transmitting and receiving, respectively. For instance, in order to determine the X-coordinate a Y-wire transmits a transmitting signal that is received by the oscillation circuit in the pen. The thereafter transmitted signal can be received by a wire from the X-wire assembly. The orthogonal arrangement of wires for transmitting and receiving, respectively, enables a spatial decoupling of the transmitting and receiving. By comparing the magnitude of the receiving signals in the different wires of the X-wire assembly, the position of the pen can be determined whereby the receiving signal is minimally influenced by the transmitting signal. The decoupling of transmitting and receiving is most efficient if the wires are single wires in contrast to coils. However, for the sake of transmission of energy by induction it is advantageous to use a coil assembly or coil arrangement, the effect of decoupling being still effective.

For sampling both the X- and the Y-coordinate of the pen it is advantageous to provide a multiplexer for each wire assembly. In this way for each coordinate measurement a transmitting signal of the respective other coordinate can be used resulting in the above described advantage.

Another advantageous embodiment of the invention is characterized in that the detection of the position data is synchronized to a nearby periodic source of noise, such as a liquid cristal display. Thereby it is possible only to carry out a sampling of position data in a time interval in which no peaks or noise disturb the measurement.

It is preferred to make the apparatus according to the invention more practical to mold a graphic or menu-table in a plastic foil. In this way, tablets can be used as a multi-field "keyboard", for instance one or more fields of the menu-table can be used for switching on/off the position detection apparatus or said plurality of connected electronic devices.

It is particularly advantageous to provide one or more pressure sensors in the pen. The sensing of the pressure can be implemented by pressing the pen onto the tablet or by pressure sensors laterally positioned on the pen (for a pressure exerted by a finger or hand). With a pressure sensor such as a continuous pressure sensing sensor, a user can for example change the line thickness or the color generated by the pen.

It is contemplated that all known possibilities to detect pressure can be used for the pressure sensors for example, in particular, a resistive, capacative or piezoelectric sensor.

Preferably the pressure sensors comprise a "function switch" that switches in response to a certain pressure whereby the switching operation can be heard and/or can be sensed by the resistance. On the one hand, this helps the user to recognize at which pressure strength his input is registered ("tactile return message") and on the other hand it helps to minimize the reaction of the pressure sensor for example by electronic noise or mechanical disturbance. This can be implemented by means of hardware and/or software means (checking whether the circuit is closed or not before processing the command input by the pressing operation).

In a preferred embodiment of the invention the pen comprises one or more switches. In case the tablet is a menu-table different menus can be selected by clicking a switch on the pen.

A pressure switch can also switch on and off, respectively, the position detection apparatus or a plurality of electronic devices connected thereto.

To further process the data that have been sampled by the pen (see the above discussion of the switches) it is advantageous that a (processing) circuit is located in the pen. It is particularly advantageous to take the supply energy for the circuit from the energy that has been transmitted to the circuit by the transmitting signal.

As the circuit in the pen for instance processes the data sampled by the pen it is particularly advantageous to provide a data memory in the circuit. Thereby sampled data can be stored and/or combined with the earlier stored data.

In a particular preferred embodiment of the invention the circuit transmits data information to the wires in the tablet. This can for instance be realized when the circuit comprises a modulator that transmits the signals or data that have been sampled in the process or stored in the pen to the wires in the tablet bit by bit. With respect to a minimization of the electronics it is advantageous if the circuit partially or as a whole is an integrated circuit (IC).

It is particularly advantageous if the information is transmitted from the wires of the tablet to the circuit in the pen. For receiving data in the pen it is particularly advantageous to provide a sub-circuit in the circuit for demodulating the transmitting signal. It is contemplated that the transmission of information takes place during a dead time (zero signal level) of the transmitting signal as thereby noise or other disturbing parts of the transmitting signal can be suppressed. Also the transmission of information can be synchronized with the transmission of position information so that the unwanted influence of a periodic source of noise can also be suppressed.

In case of an active electronic circuit being located in the cordless and battery-less pen, it is possible that the pen is continuously in possession of a certain user so that it is interesting for applications in data protection to protect the transmitted information by cryptographic algorithms.

It is also advantageous to store in the memory of the circuit a coding and decoding key, respectively. In this way coded information can be coded and decoded, respectively, by the pen and thereby efficiently protected.

In another embodiment of the invention, the information can consist of a password and the memory can contain a password, respectively. Thus a tablet and electronic devices possibly connected thereto can only be used with a certain pen, in particular being switched on and off.

It is particularly advantageous to store data relating to a personal signature in the transmitting information or in the memory. For instance a user can only work with the position detection apparatus and connected devices if he is in possession of the correct pen and/or signs once on the position detection area or tablet. In this way the signing of documents that are located on a remote location is safe and reliable.

In this context it is particularly advantageous if the position detection apparatus that serves for sampling data, or parts of it, is connected to further devices that store, transmit or process data. This can be for example a screen, a telephone, a computer, a printer and so on.

With respect to a commercial application of the position detection apparatus it is advantageous to provide an operation time counter in the position detection apparatus. This is important for instance for data protection purposes because it can be determined who, when and how long has used the apparatus and can also serve for determining costs. For this purpose the circuit contains an oscillator and counts until the session is finished. This can be noted by the absence of an inductive coupling or by transmitting information into the pen. The final value can then be stored in memory.

The reading of the end value from the memory can also be carried out by inductive coupling without contact for example by putting the pen into a special holder. Here an oscillation of the oscillation circuit of the pen or another circuit(a circuit that is tuned to a different frequency) excited and thereby a sub-circuit is supplied with energy that controls modulation of the radiated or transmitted signal that contains the information about the operating time. A special holder of this kind is particularly adapted to change data that are stored in the pen, for example passwords, by transmitting new data into the pen.

For a manipulation of one- or multi-dimensional objects for example on a screen a plurality of degrees of freedom is needed. In an embodiment of the present invention that has been described further above, pressure sensors are provided at the pen to sample an increased number of degrees of freedom/parameters in the pen and to transmit these parameters to the tablet and connected devices, respectively. This is also possible by using a plurality of pens and/or a plurality of coils in the pen or non-circular shaped or assymetric coils. Thereby rotations of the pen can be recognized by the tablet and then used for transmitting information, respectively. Thus for example connecting two mechanical components can be simulated with the two pens on the tablet and displayed on a screen and inputed into a computer, respectively, by using a plurality of pens and coils, respectively, in the pen. It has to be noted that the coils should not be too near to each other to avoid disturbing effects resulting from the coupling. The common sampling of position data of the pens can be separated in the time domain but also in the frequency domain.

BRIEF DESCRIPTION OF THE DRAWINGS

For a more complete understanding of the invention and the advantages thereof, reference is made to the following description taken in conjunction with the accompanying drawings in which:

FIG. 4 illustrates the generation of the transmitting signal from the generated signal in the resonance circuit and the receiving signal as well as furtherly processed signals for different coils of the tablet lying next to each other in connection with a position detection;

FIG. 5 also illustrates the generation of the transmitting signal, the signal being generated in the oscillation or resonance circuit, the receiving signal as well as furtherly processed signals of a selected coil, whereby in addition to FIG. 4 the signal being transmitted by the resonance circuit is modulated by coded data bit by bit and is in use in the wires of the tablet;

FIG. 6 illustrates an embodiment of the electronics of the pen whereby in the pen not only transmitting but also receiving of data is provided for;

DESCRIPTION OF THE INVENTION

Figure 1:
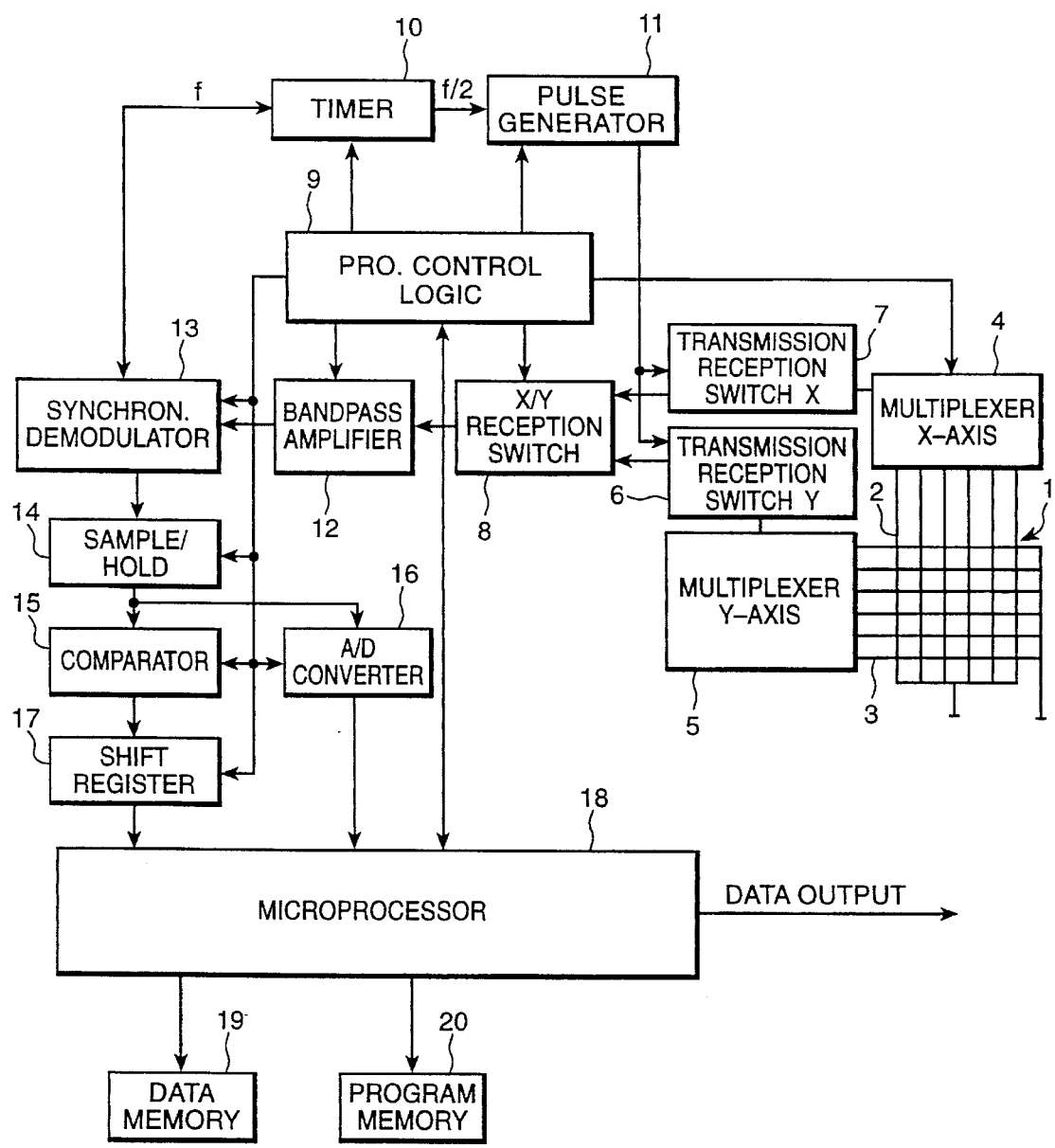
FIG. 1 illustrates an embodiment of the position detection apparatus without the pen.

FIG. 1 schematically illustrates a position detection apparatus or digitizer without the pen. The tablet 1 is formed by the conductors (wires and coils, respectively) 2 running along the X-direction and conductors 3 running along the Y-direction.

All wires that are running along the X-direction are connected to an X-selection switch (X-multiplexer) 4. The Y-wires are connected to an Y-multiplexer 5. For switching from transmitting to receiving in the X- and Y-direction, respectively, two transmission reception-switches 7 and 6, respectively, are provided. A transmitting signal is provided by a pulse generator 11 that is controlled by a timer 10 and a controller 9. For reception the X/Y-reception switch 8 switches between X- and Y-reception. The received signals are amplified in an band pass amplifier 12 and demodulated in a synchronous demodulator 13. For further processing a sample hold-integrator 14 is provided that integrates a rectified signal and a holding value of it is a measure for the relative distance between the respective receiving wire to the pen. An A/D-converter 16 and a comparator 15 in connection with a shift register 17 connects the sample hold-integrator 14 with a microprocessor 18. The microprocessor 18 is connected to a data memory 19 and a program memory 20. In the data memory 19 for example theoretical curves for the signals to be received in different wires dependent on the number of considered wires, the numbers of the windings of the coils, an so on are stored. A program is stored in the program memory that for example takes also into consideration the orientation of the pen with respect to the tablet.

Figure 2:
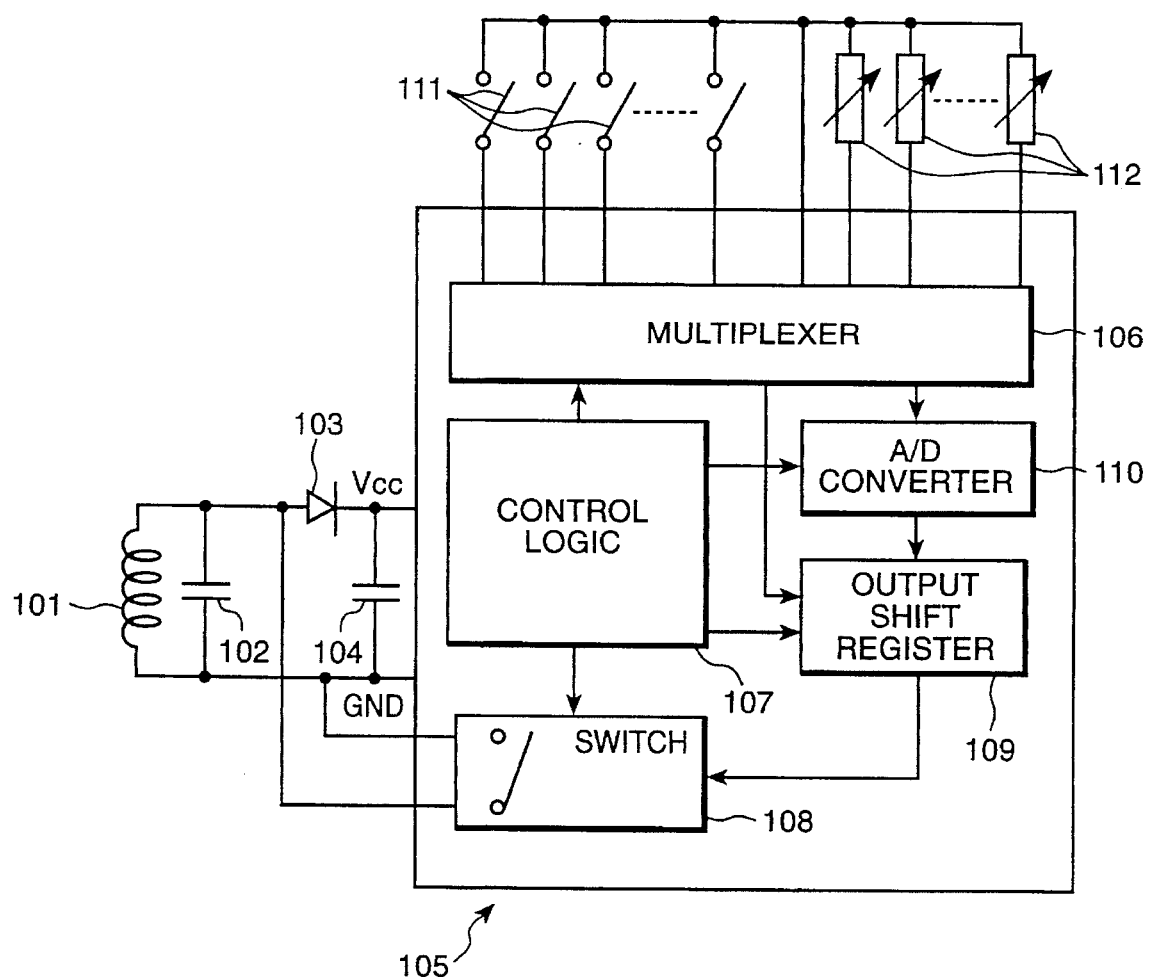
FIG. 2 shows a simplified illustration of an embodiment of the electronics in the pen.

Referring now to FIG. 2, the electronics in the pen is shown comprising a resonance or oscillation circuit being formed by the coil 101 and the capacitor 102 and an integrated circuit 105. The integrated circuit is power supplied by the resonance circuit by a rectifying circuit comprising a diode 101 and a capacitor 104 supplying the supply voltage $V_{CC}$. The electronics further comprise different switches 111 and pressure sensors 112 in the pen that can be pressed by the user during operation of the pen. The processing of the signals is carried out in the circuit or circuit assembly 105. A multiplexer 106 has access to the single switches and pressure sensors, respectively. A control logic 107 controls conversion of the sampled analog data into digital signals by an A/D-converter 110 that operates a switch 108 by means of an output shift register, that closes the resonance circuit periodically. Thereby, the information detected in the pen of the digitizer can be transmitted bitwise. It has to be noted that the electric and magnetic energy, respectively, is continuously stored in the resonance circuit whereby there are no transient oscillations (starting and ending of an oscillation) via closing and opening the switch, respectively.

Figure 3:
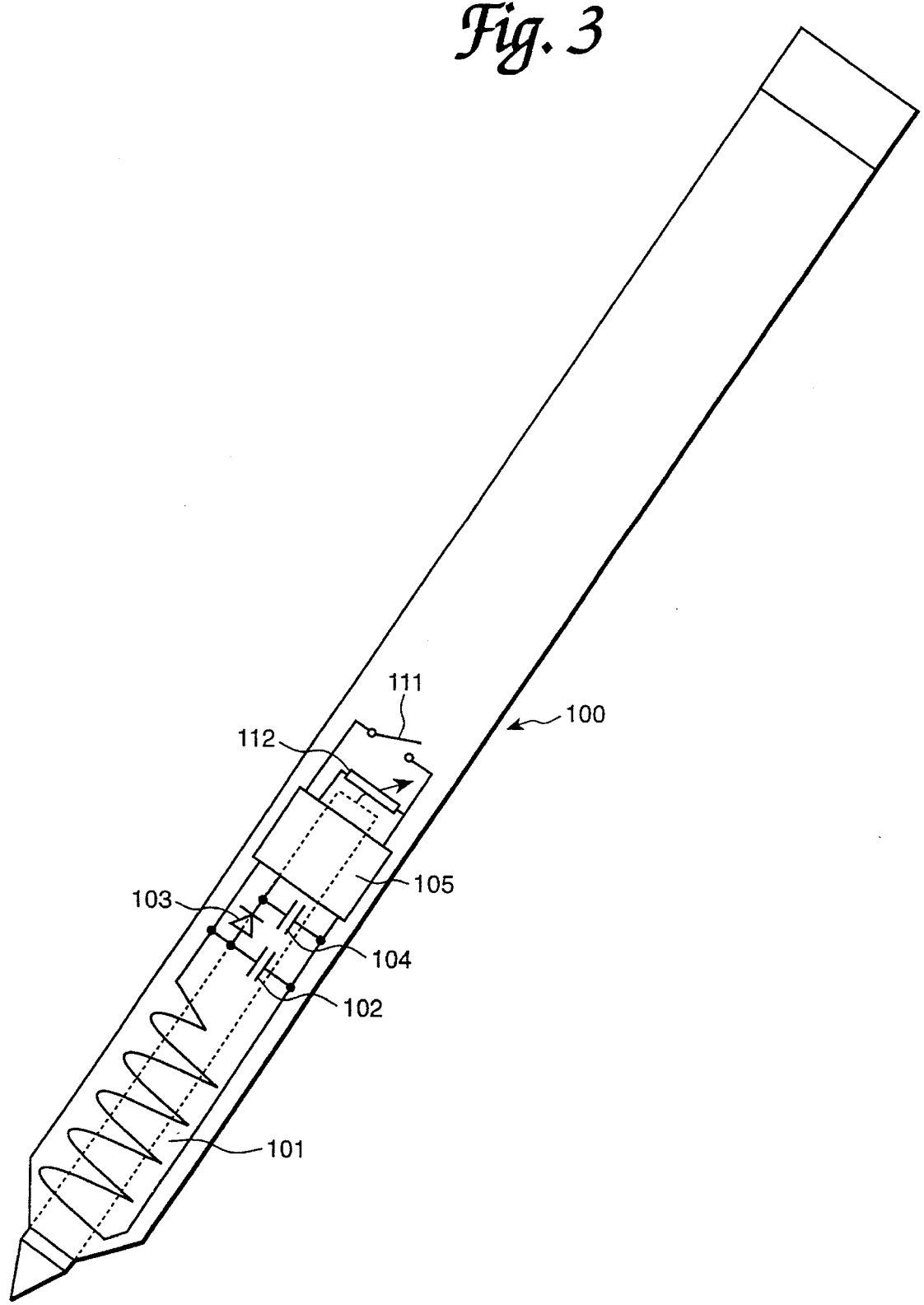
FIG. 3 schematically illustrates an embodiment of a pen according to the invention.

Referring now to FIG. 3, a pen 100 is shown comprising a coil 101 and a capacitor 102 forming a resonance circuit for receiving the electrical energy for the integrated circuit 105 and for radiating or emitting with respect to the position detection. The power supply of the circuit 105 is done by a rectifier circuit comprising a diode 103 and a capacitor 104. Also the switch 111 and the pressure sensor 112 are shown in FIG. 3.

FIG. 4 schematically illustrates the principle according to the invention, i.e. to detect the position of the pen with respect to the tablet. There are four coils designated by "coil X–2", "coil X–1", "coil X", "coil X+1" and the signals of these coils.

FIG. 4a shows a starting clock signal that is divided by two in the timer 10 as shown in FIG. 4b. The transmitting signal generated by the pulse generator 11 is shown in FIG. 4c. The transmitting signal has only to be transmitted by one coil, preferably the coil nearest to the pen, for example the coil X. FIG. 4d shows the oscillator signal generated in the resonance circuit of the pen that in turn generates in the coils X–2, X–1, X and X+1 a signal, shown in FIG. 4f. To detect the magnitudes of the signals and to digitize the data a synchronous rectifier and an integrator-sample hold-circuit is necessary. FIG. 4f which shows the synchronously rectified and induced voltage signal whereby the synchronous rectifier has beside the rectifying also a filter function. FIG. 4e shows the integrated signal, whereby it is integrated over two trains of half waves of the rectified signal, in a dead time of the transmitting signal (see FIG. 4c). The magnitude of holding values detected by the above explained method can now be processed in the microprocessor by common numerical methods to determine the nearest coil to the pen. It is considered that in two dimensions the transmitting coils are preferably orthogonal to the receiving coils.

FIG. 5 shows a plurality of signals that are transmitted and received, respectively, in the coil X. FIG. 5a shows a clock signal. FIG. 5b shows the clock signal divided by two by the timer 10. The output of the pulse generator is shown in FIG. 5c. The generated oscillation in the resonance circuit of the pen is shown in FIG. 5d. In contrast to FIG. 4 now transmitting data that are bitwise coded by closing the switch 108 are modulated upon the transmitting signal. The transmitting data are shown in FIG. 5e and the condition of the modulation switch 108 is shown in FIG. 5f. A modified transmitting signal by closing the modulation switch is shown in FIG. 5g. It has to be noted that there is no loss in the rate of data transmission and the data accuracy because of the continuously stored energy in the resonance circuit as can clearly be recognized from FIG. 5g. FIG. 5h shows the induced voltage in a coil of the tablet. This induced signal is now, as shown in FIG. 5i, synchronously rectified and, as shown in FIG. 5j, integrated and the peak value of which is held. In a dead time the pulse generator hold value can be read to be used for the position detection and by means of a comparator the transmitted data can be reconstructed as is shown FIG. 5k.

Figure 6:
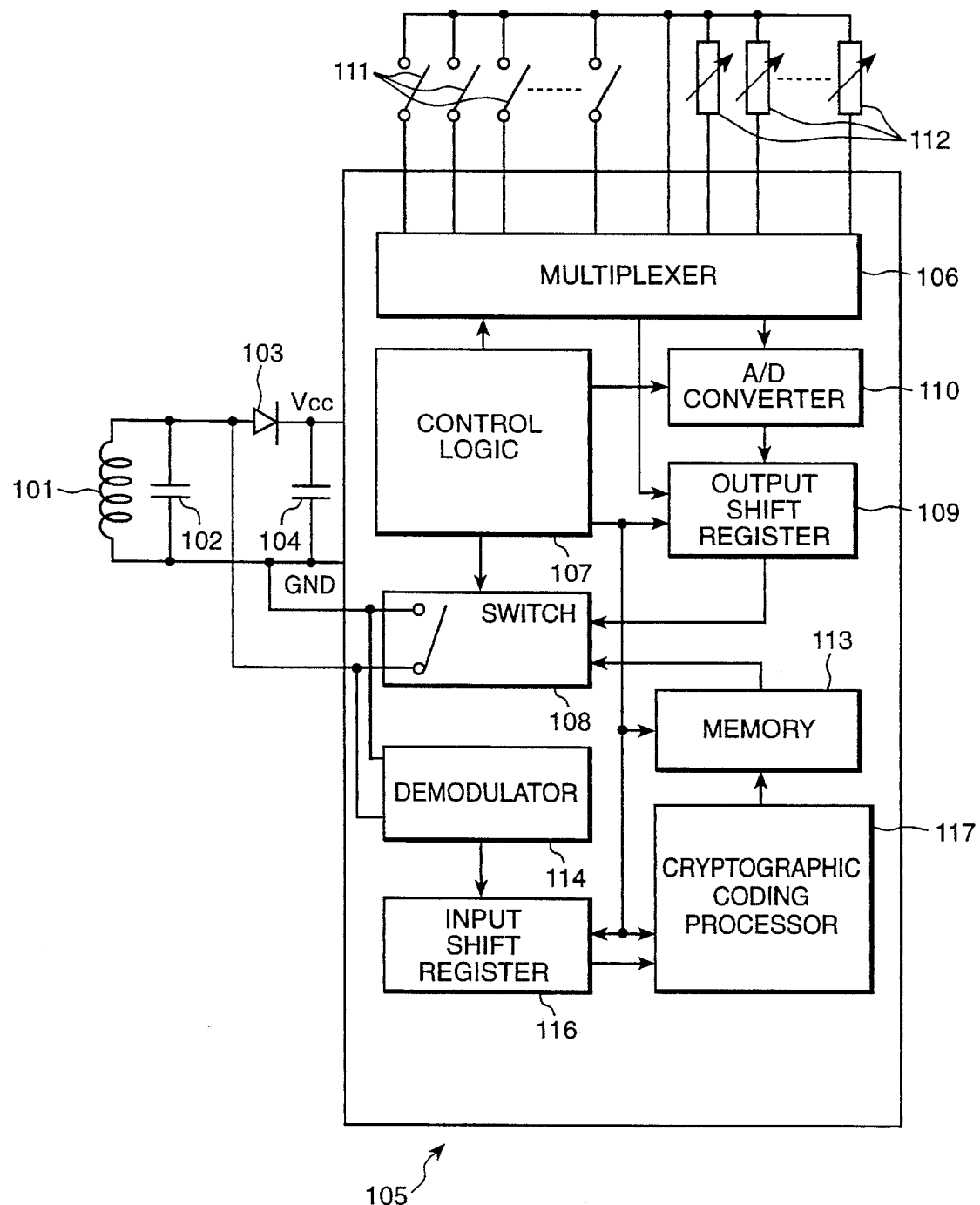

FIG. 6 shows an alternative version of the electronics of the pen analogous to FIG. 2 wherein additional elements for receiving of data in the pen are provided. Furthermore, a cryptographic or coding processor 117 is provided to decode the received data and transmitted data, respectively. A demodulator 114 demodulates the data received of the resonance circuit 101/102 and supplies them to an input shift register 116. From there they can be stored in a memory 113, coded and decoded, respectively, in a cryptographic or coding processor 117 or be used for example for the control logic 107.

Figure 7:
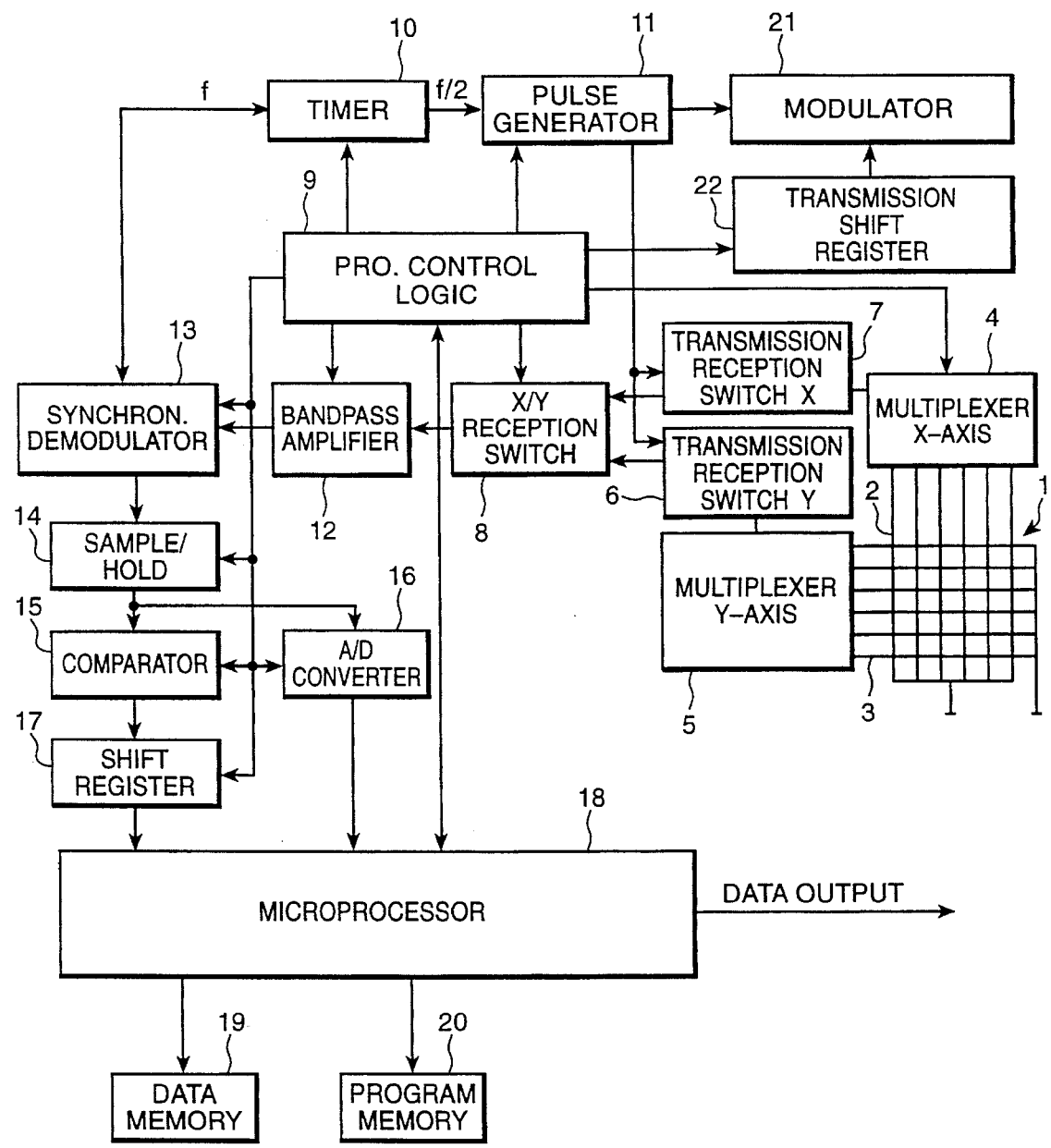
FIG. 7 illustrates an embodiment of the invention without the pen in which a modulator in the pen is provided for the transmission of information.

FIG. 7 is analogous to FIG. 1 with an additional modulator 21 and an additional transmitting shift register 22 by the signal generated by the pulse generator 11 which can be received in the pen analogously to FIG. 6. The modulation controlled transmission is carried out analogously to the above explained transmission of information from the pen to the coils in the tablet.

Figures 8, 9:
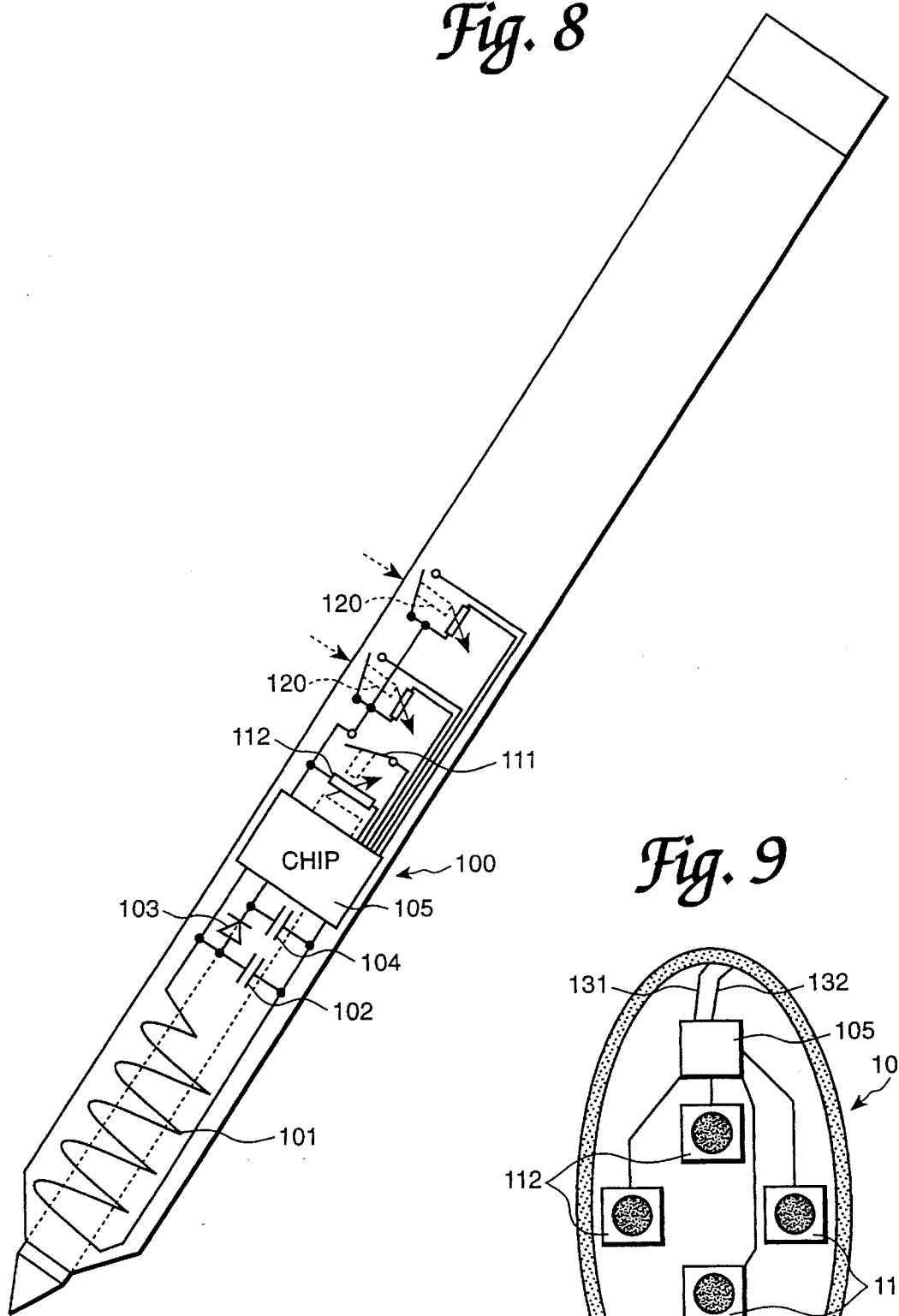
FIG. 8 illustrates an embodiment of the pen with combined pressure sensors/switches.
FIG. 9 is an embodiment of the pen with an oval shaped coil and four coupled pressure sensors.

FIG. 8 shows an alternative embodiment of the pen wherein in addition to the switch 111 and pressure sensors 112, pressure sensors 120 are provided that comprise function switches so that only after closing the switches the pressure sensors are enabled or activated which means higher security and reliability of the system for the user.

FIG. 9 shows a pen 100 comprising an oval-shaped coil 101. The non-circular symetric form of the coil 101 results in that a pure rotation of the pen 100 in the plane of the tablet 1 can be detected. Furthermore, the in-going and out-going lines 130 and 131, respectively of the coil 101 are shown. In this embodiment four pressure sensors 112 are provided that detect a pressure exerted by a finger or the hand. Using the embodiment of FIG. 9 additional degrees of freedom and/ parameters can be detected or sampled in the pen 100 and transmitted to the tablet 1. The sum of the pressures detected by the four pressure sensors 112 (= the absolute value of the total pressure vector) is a measure for the total force exerted on the pen 100 and can be used for example for detecting and manipulating the Z-coordinate of an object. Furthermore, a shift of the center of the pressure can be detected by the arrangement of the pressure sensors 112.

The direction and the absolute value of this shift vector are further available parameters that can be used for example for controlling the rotation of a three dimensional rigid body around the main axes of inertia. Together with the input information of the translation by the movement of pen 100 on the tablet 1 (2 degrees of freedom: x, y) and the total pressure (1 degree of freedom: z) all 6 degrees of freedom of a rigid body can be parameterized and inputted, respectively in this way with a pen 100 in a very clear and analogous way. A rotation of the pen 100 in the plane of the tablet 1 can also be a parameter because the coil 101 is not rotationally symetric. It has to be noted that the ways of inputing the pressure, for example bending a finger or pressing the key 150, can be correlated with the respective manipulation of an object, i.e. with an corresponding rotation and downward movement that makes the operation easier and simpler. Because of the 180°-symmetry of the coil 101 no full rotation around 360° of an object can be simulated with the pen.

Figure 10:
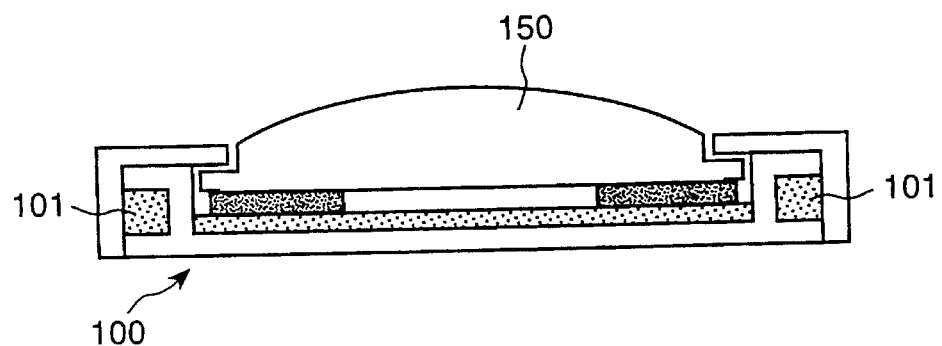
FIG. 10 is a cross section of the cursor of FIG. 9.

FIG. 10 shows a cross section of the pen shown in FIG. 9. A key 150 is arranged upon the four pressure sensors 112. By using the point of pressure, strength and direction of the pressure, respectively, parameters and degrees of freedom for the motion can be transmitted by the pen 100 to the tablet 1 and to electronic devices connected thereto.

Figure 11:
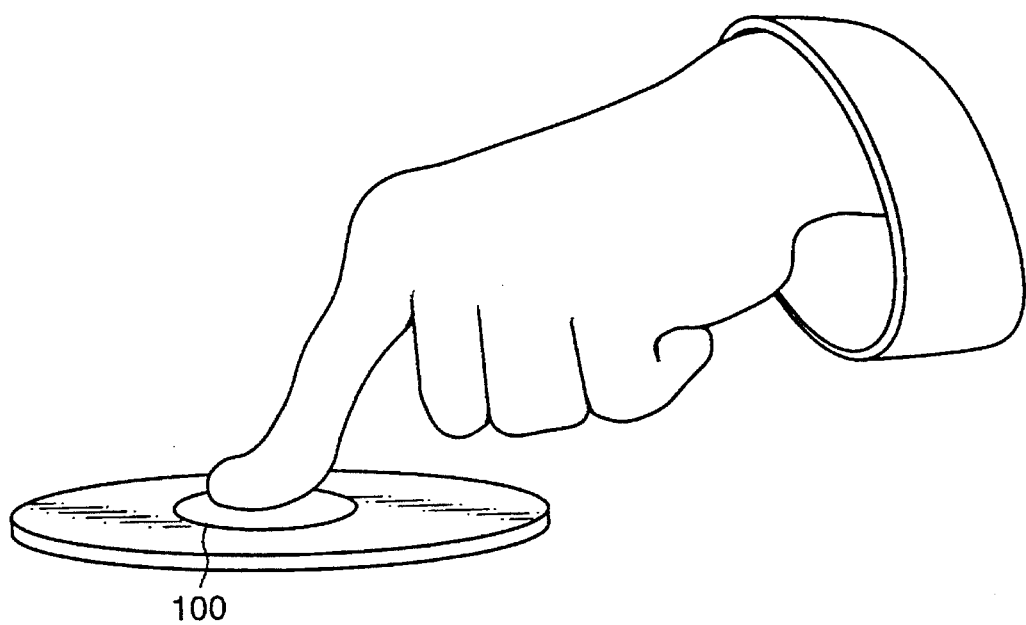
FIG. 11 illustrates the operation of the pen according to FIG. 9 with one finger.

FIG. 11 shows the operation of pen 100 shown in FIG. 9. It has to be noted that neither the hand nor the finger can be rotated around 360° which means that the restriction by the coil symmetry of the pen shown in FIG. 9 is not relevant to the practice.

Figure 12:
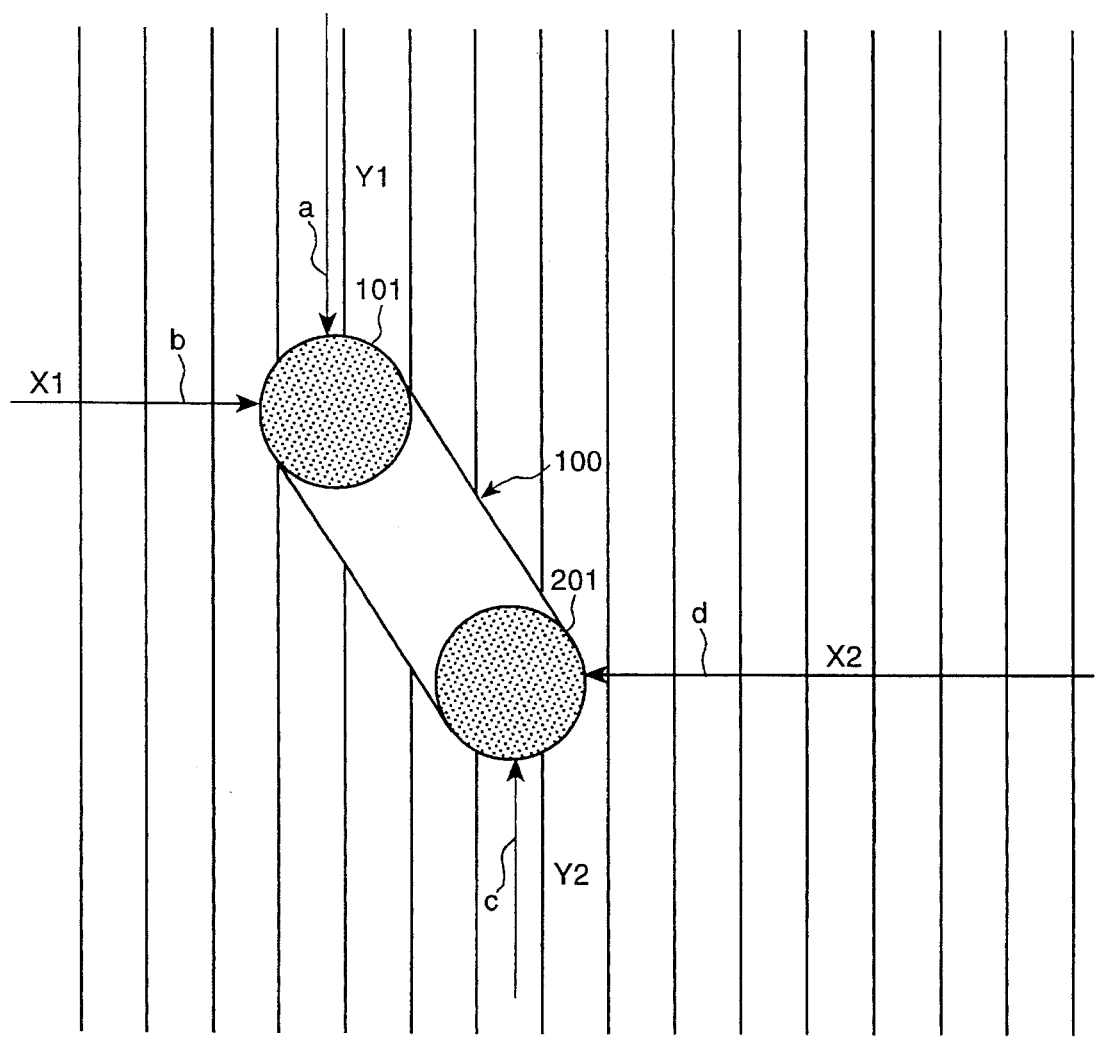
FIG. 12 illustrates an embodiment of the pen with two circularly shaped but distinguishable coils.

FIG. 12 illustrates a pen 100 with two circularly shaped coils 101, 210. As already discussed above it is possible to determine each of the coils and the position of the center, respectively, separately. This is due to the fact that both coils 101, 201 are distinguishable by assigning to them, as already explained above, two different pass words, codes or also different frequencies. With such an arrangement an object on a screen can be turned around by 360° because of the distinguishability of the coils 101, 201. It has to be understood that this is also possible with a different arrangement of coils that are not rotationally symetric. Both coils 101, 201 may not be too close to each other to avoid disturbing effects arising from the coupling of the two coils. Preferably in operation the position of both coils 101, 102 are determined alternately. The detection of the position of the two centers of the coils can be carried out in different ways and for detecting the movement of the total cursor system. For instance the X-position X1 of the coil 1 can be detected by determining the closest wire that is best for the transmission of energy all wires or coils of the Y-coils 3 are sampled in the direction of the arrow designated by a. Analogously the coordinates Y1 is determined by sampling the X-coil assembly 2 along the direction b, the X2 position by sampling the Y-coils in the direction c, the position Y2 by sampling the X-coil assembly in the direction of the arrow d. In this way the single positions of the coils are determined or detected with a small influence of one coil to the respective other coil.

Figure 13:
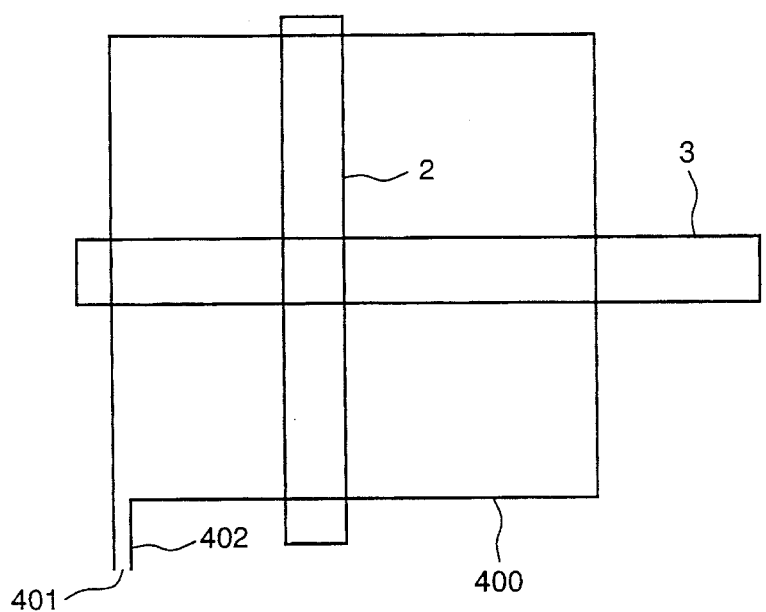
FIG. 13 illustrates an embodiment of the present invention in which a coil around the tablet is provided for exciting the resonance circuit in the pen.

Referring now to FIG. 13, a digitizer tablet is shown comprising an assembly of coils 2 and an assembly of coils 3 orthogonal thereto. Around the tablet a coil 400 is arranged comprising terminals 401 and 402. In the embodiment of FIG. 13 the supply energy for the pen 100 is supplied by the coil 400 and not by a coil of the coil assemblies in the X and Y directions, respectively. Alternatively a coil 400 cannot be located around the tablet but around a liquid cristal display. There is so much power supplied by the coil 400 to the pen 100 that as coils 2 and coils 3, respectively, foils can be used or vaporized sheets of glass. This is much cheaper than using a printed circuit board.

Figure 14:
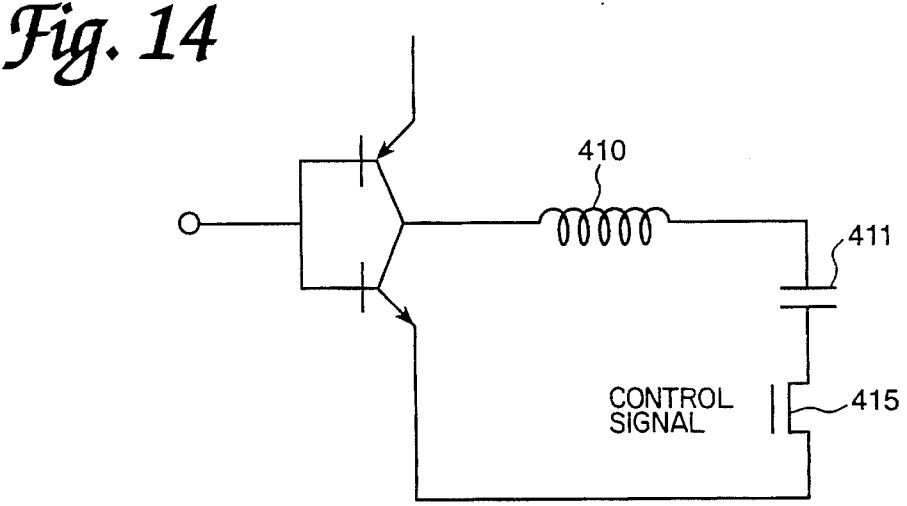
FIG. 14 illustrates a circuit for driving the coil of FIG. 13.
Figure 15:
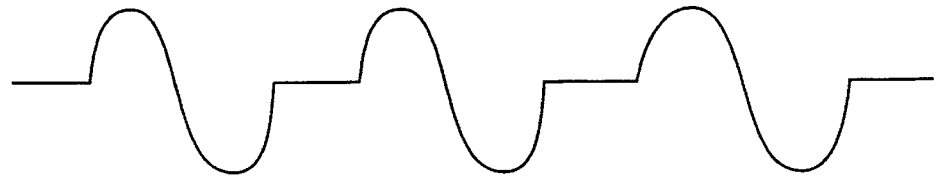
FIG. 15 illustrates a wave form of the signal in the circuit of FIG. 14.

Referring now to FIG. 14, a resonance circuit is schematically shown comprising a coil 410, a capacitor 411 and a field effect transistor switch 415. In FIG. 15 the signal being generated by the circuit shown in FIG. 14 is shown. By switching on and off the transistor switch 415 the oscillation is periodically modulated but the energy stored in the resonance circuit is constant.

Figure 16:
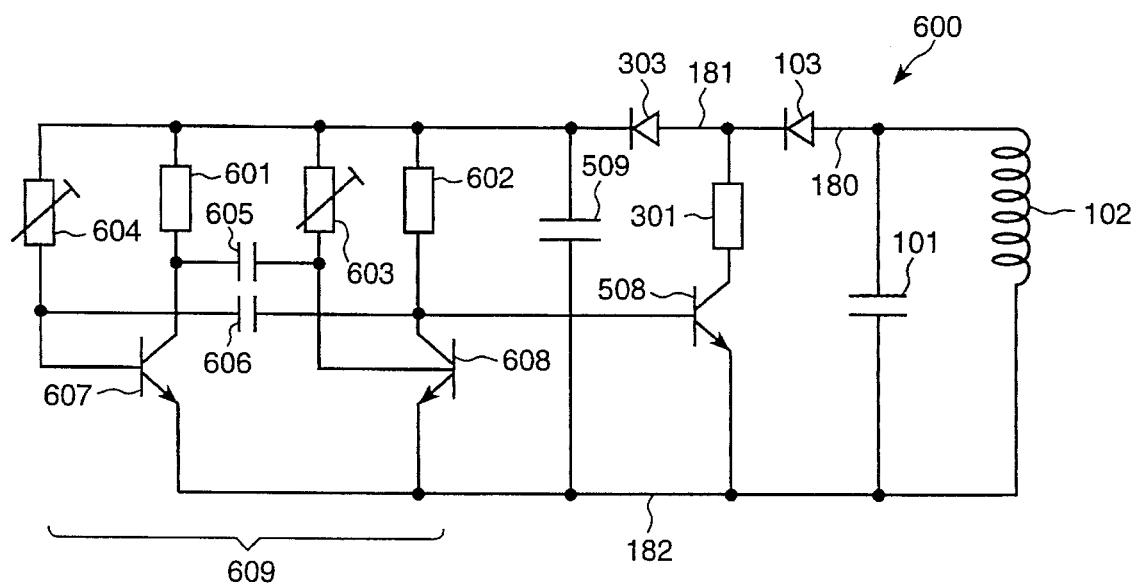
FIG. 16 illustrates an alternative implementation of the features on the pen by means of a multivibrator.

Referring now to FIG. 16, an alternative embodiment of the invention is shown. The circuit 600 is located in the pen and is an alternative realization for detecting and transmitting the pressure sensed by the pressure sensor 112. The circuit 600 comprises a coil 102, a capacitor 101, forming the resonance circuit. The capacitor 101 and the coil 102 are connected in parallel. The capacitor 101 is connected to a rectifying diode 103 by a line 180. The diode 103 is connected to a second diode 303 by a line 181. Parallel to the capacitor 101 a resistor 301 and a transistor 508 are provided. The transistor 508 plays the role of the switch 108, see for example the embodiment of FIG. 2. The gate electrode of the transistor 508 is connected to the output of a multivibrator 601. The capacitor 509 is in parallel to the resistor 301 and the transistor 508. A line 182 is provided to connect the capacitor 101 to one side of the multivibrator 601 to supply a DC-voltage. The multivibrator 301 is fairly standard and consists of transistors 607, 608, capacitors 605, 606, variable resistors 603, 604 and resistor 601, 602. The multivibrator circuit 601 is not stable and always switches from one state to another state. Thereby opening and closing the switch 508. The switching times, i.e. the time intervals, t1 and t2 during which the multivibrator 601 is in a certain state depends on the values of the resistors and capacitors. Hence the pressure sensitive resistor 603 and 604 converts the sensed pressure signal into the different time intervals when the oscillation of the resonance circuit 101, 102 is on and off (i.e. undampened and dampened, repectively). This signal is transmitted to the tablet and by noting the times t1 and t2, the state of the pressure sensors 603 and 604 can be detected.

Figure 17:
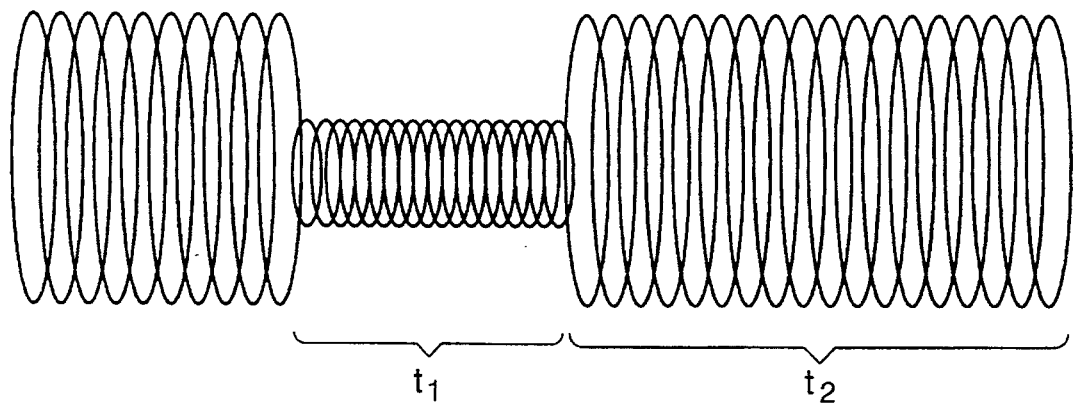
FIG. 17 illustrates the wave form generated by the circuit of FIG. 16.

Referring now to FIG. 17 the signal in the resonance circuit 101 and 102 is schematically illustrated. For a time t1 the oscillation in the resonance circuit 101, 102 is dampened because of closing the switch transistor 508 whereby the resistor 301 is parallel to the capacitor 101. During the time interval t2 the switch transistor 508 is open and there is no dampening of the oscillation. By detecting the time intervals t1 and t2 (time interval of constant amplitude of oscillation) in the signal transmitted by the pen the pressures sampled by the pressure sensitive resistors 603, 604 can be transmitted to the tablet. This is an alternative embodiment to the embodiment shown in FIG. 6. In this embodiment one does not need a shift register nor an A/D converter, and no modulator.

Without further analysis, the foregoing will so fully disclose the gist of the present invention that others can readily adapt it for various applications with omitting features that, from the stand point of prior art, fairly constitute essential characteristic of the generic or specific aspects of this invention and, therefore, such adaptions should and are intended to be comprehended within the meaning and range of equivalence of the following claims.

For example a combination of the above disclosed features, for instance a combination of pressure sensors and switches with a program for recognizing signatures has to be considered. Furthermore the position protection apparatus can operate also in one dimension. It has to be noted that when the pen is first set upon the tablet the optimum coil for transmission has to be found where a slater coil has only to be changed to the neighbouring coil when the pan is moved upon the tablet.

We claim:

1. A cordless position detection apparatus, comprising:
   a position detection area in which a plurality of conductors are provided that are arranged in direction of the measurement of the position side
   a selection circuit for selecting single conductors;
   a transmitting circuit that provides a transmitting signal to a selected conductor said transmitting signal comprising at least one harmonic;
   a pointer comprising a resonance circuit that is excited by the transmitting signal to oscillate and that radiates a receiving signal;
   a receiving circuit for detecting the receiving signal in a selected conductor; and
   processing means for determining a position indicated by the pointer by processing the receiving signals detected by the receiving circuit, wherein the resonance circuit is tuned to an harmonic of the transmitting signal.

2. A cordless position detection apparatus according to claim 1, wherein the transmitting signal comprises square pulses.

3. A cordless position detection apparatus according to claim 2, wherein the transmitting signal comprises a dead time.

4. A cordless position detection apparatus according to claim 3, wherein the detection of the receiving signal is carried out in said dead time or the transmitting signal.

5. A cordless position detection apparatus according to claim 1, wherein a position detection area comprises two sets of conductors that are orthogonal to each other and the single conductors of which are arranged side by side in direction of the measurement of the position.

6. A cordless position detection apparatus according to claim 5, wherein conductors from different sets of conductors are provided for transmitting or emitting and receiving.

7. A cordless position detection apparatus according to claim 5, wherein a transmission-reception switch is provided for each set of wires.

8. A cordless position detection apparatus according to claim 1 with a synchronization to a close and periodic source of noise.

9. A cordless position detection apparatus according to claim 1, wherein the position detection area comprises a graphic- and/or menutable.

10. A cordless position detection apparatus according to claim 1, wherein cordless position detection apparatus switches on and off respectively, by bringing or removing the pointer to and from the position dection area; respectively.

11. A cordless position detection apparatus according to claim 1, wherein one or more pressure sensors are provided in the pointer.

12. A cordless position detection apparatus according to claim 11, wherein at least one pressure sensor is a resistance sensor.

13. A cordless position detection apparatus according to claim 11, wherein at least one pressure sensor is a capacitive sensor.

14. A cordless position detection apparatus according to claim 11, wherein at least one pressure sensor is a piezoelectric sensor.

15. A cordless position detection apparatus according to claim 11, wherein at least one pressure sensor comprises a function switch, that enables operation of the pressure sensor.

16. A cordless position detection apparatus according to claim 1, wherein one or a plurality of switches are provided in the pointer.

17. A cordless position detection apparatus according to claim 1, wherein energy is taken from the pointer from the resonance circuit to supply a circuit or circuit assembly.

18. A cordless position detection apparatus according to claim 17, wherein the circuit comprises a data memory.

19. A cordless position detection apparatus, particularly according to claim 17, wherein the circuit comprises an A/D converter.

20. A cordless position detection apparatus according to claim 17, wherein the circuit transmits information to the conductors in the position detection area and/or that the circuit receives information of the conductors in the position detection area.

21. A cordless position detection apparatus according to claim 20, wherein the information contains information about the states of the switches located at the pointer.

22. A cordless position detection apparatus according to claim 20, wherein the information contains information about the relative position of at least two coils in the pointer and/or a non-circular shaped coil with respect to the position detection area.

23. A cordless position detection apparatus according to claim 20, wherein a circuit or sub-circuit is provided in the circuit or circuit assembly for the transmission of information from the pointer that modulates the receiving signal.

24. A cordless position detection apparatus according to claim 17, wherein a sub-circuit is provided in the pointer for the transmission of information that demodulates the transmitting signal.

25. A cordless position detection apparatus according to claim 20, wherein the information is protected by a cryptographic algorithm.

26. A cordless position detection apparatus according to claim 18, wherein a (de-)coding key and (de-)coding information, respectively, is stored in the data memory of the circuit.

27. A cordless position detection apparatus according to claim 18, wherein the information and/or the memory contains a password.

28. A cordless position detection apparatus according to claim 18, wherein the information and/or data memory contains signature specific data.

29. A cordless position detection apparatus according to claim 1, wherein the cordless position detection apparatus or parts of it are connected to other devices that transmit data.

30. A cordless position detection apparatus according to claim 17, wherein the circuit in the pointer comprises an oscillator.

31. A cordless position detection apparatus according to claim 18, wherein means are provided to read out the time of operation from the data memory in the pointer.

32. A cordless position detection apparatus according to claim 1, wherein at least a further pen or at least a further coil are provided in a pointer.

33. A cordless position detection apparatus according to claim 1, wherein the pointer or pen comprises a plurality of sensors that are arranged under a common key or push-button.

34. A cordless position detection apparatus according to claim 1, wherein the pointer comprises a non-circular coil.

35. A cordless position detection apparatus according to claim 32, wherein the further pointers or the further coils are distinguishable for said processing means.

36. A cordless position detection apparatus according to claim 1, wherein the pointer comprises a non-circular coil by means of which a rotation of the pointer in a plane can be detected.

37. A cordless position detection apparatus of claim 1, wherein at least two coils are provided in a pointer by which a rotation of the pointer can be recognized, said coils having different frequencies and/or different codes and/or different passwords to distinguish then.

38. A cordless position detection apparatus according to claim 36, wherein at least two distinguishable pointers are provided.

39. A cordless position detection apparatus according to any of the claim 36, wherein the pointer comprises at least two additional sensors.

40. A cordless position detection apparatus according to claim 39, wherein the sensors are arranged under a common key or push-button.

41. A cordless position detection apparatus according to claim 36, wherein at least one pointer comprises an A/D converter.

42. A cordless position detection apparatus according to claim 36, wherein information about the relative position of at least two coils in the pointer and of at least two pointers, respectively, and/or of one non-circular shaped coil with respect to the position detection area is transmitted from the pointer.

43. A cordless position detection apparatus comprising a position detection area and a pointer, wherein a coil arranged around the position detection area is provided in order to supply energy to a first resonance circuit in the pointer.

44. The cordless position detection apparatus according to claim 43, wherein a switch, is provided in a second resonance circuit comprising the coil arranged around the position detection area and a capacitor to switch on and off the resonance circuit.

45. The cordless position detection apparatus according to claim 44, wherein the switch is a transistor.

46. A cordless position detection apparatus comprising:
a position detection area and a pointer, wherein the pointer comprises a resonance circuit and a plurality of pressure sensors, said pointer comprising means for translating the pressure values sensed by the pressure sensors into a time duration ($t_1$, $t_2$) during which characteristics of the oscillation in said resonance circuit are changed.

47. The cordless position detection apparatus according to claim 46, wherein the characteristics comprise the amplitude of the oscillation in said resonance circuit.

48. The cordless position detection apparatus according to claim 46, wherein said pressure sensors are pressure-sensitive resistors forming part of a multivibrator.

49. A cordless position detection apparatus comprising:
a position detection area in which a plurality of conductors are provided that are arranged in direction of the measurement of the position side by side;

a selection circuit for selecting single conductors;

a transmitting circuit that provides a transmitting signal to a selected conductor;

a pointer comprising a resonance circuit that is excited by the transmitting signal to oscillate and that radiates a receiving signal;

a receiving circuit for detecting the receiving signal in a selected conductor; and processing means for determining a position indicated by the pointer by processing the receiving signals detected by the receiving circuit;
wherein the pointer further comprises a switch and a control circuit, said control circuit being adapted to open and close the switch to thereby enable or disable an oscillation in the resonance circuit whereby coded information can be transmitted from the pointer to the position detection area.

50. A cordless position detection apparatus comprising:
a position detection area in which a plurality of conductors are provided that are arranged in direction of the measurement of the position side by side;

a selection circuit for selecting single conductors;

a transmitting circuit that provides a transmitting signal to a selected conductor;

a pointer comprising a resonance circuit that is excited by the transmitting signal to oscillate and that radiates a receiving signal;

a receiving circuit for detecting the receiving signal in a selected conductor;

processing means for determining a position indicated by the pointer by processing the receiving signals detected by the receiving circuit; and a control circuit adapted to enable or disable the transmitting signal, whereby coded information can be transmitted from the position detection area to the pointer.

51. A cordless position detection apparatus comprising:

a position detection area in which a plurality of conductors are provided that are arranged in direction of the measurement of the position side by side;

a selection circuit for selecting single conductors;

a transmitting circuit that provides a transmitting signal to a selected conductor;

a pointer comprising a resonance circuit that is excited by the transmitting signal to oscillate and that radiates a receiving signal;

a receiving circuit for detecting the receiving signal in a selected conductor; and processing means for determining a position indicated by the pointer by processing the receiving signals detected by the receiving circuit;

wherein the pointer comprises a plurality of pressure sensors arranged under a common key or push button and wherein the resonance circuit comprises a coil that is non-circular.

52. The cordless position detection apparatus according to claim 51, wherein the coil is elliptically shaped.

53. The cordless position detection apparatus according to claim 51, wherein the four pressure sensors are arranged under the common key so as to form the corners of a parallelogram.

54. A cordless position detection apparatus comprising:

a position detection area in which a plurality of conductors are provided that are arranged in direction of the measurement of the position side by side;

a selection circuit for selecting single conductors;

a transmitting circuit that provides a transmitting signal to a selected conductor;

a pointer comprising a resonance circuit that is excited by the transmitting signal to oscillate and that radiates a receiving signal;

a receiving circuit for detecting the receiving signal in a selected conductor; and processing means for determining a position indicated by the pointer by processing the receiving signals detected by the receiving circuit;

wherein the pointer comprises a plurality of pressure sensors arranged under a common key or push button and at least a second resonance circuit.

55. The cordless position detection apparatus according to claim 47, wherein said pressure sensors are pressure-sensitive resistors forming part of a multivibrator.

56. The cordless position detection apparatus according to claim 52, wherein the four pressure sensors are arranged under the common key so as to form the corners of a parallelogram.

\* \* \* \* \*